United States Patent [19]

Takenaka

[11] Patent Number: 4,522,442

[45] Date of Patent: Jun. 11, 1985

[54] TRUNK STORAGE SYSTEM FOR SMALL VEHICLES

[75] Inventor: Masahiko Takenaka, Saitama, Japan

[73] Assignee: Honda Giken Kogyo Kabushiki Kaisha, Tokyo, Japan

[21] Appl. No.: 459,483

[22] Filed: Jan. 20, 1983

[30] Foreign Application Priority Data

Jan. 20, 1982 [JP] Japan .................. 57-7093

[51] Int. Cl.³ .............................................. B62J 7/00
[52] U.S. Cl. .................. 296/37.1; 296/78.1;
280/289 A; 180/215; 180/219; 224/30 R;
224/42.42
[58] Field of Search .......... 296/37.1, 76, 78.1,
296/78 R; 280/289 A, 289 H, 289 S; 224/30 A,
30 R, 31, 32 A, 32 R, 36, 42.42 R, 273; 180/219,
210, 215; 296/78 R

[56] References Cited

U.S. PATENT DOCUMENTS

| 1,815,656 | 7/1931 | McMurry | 296/37.1 |
| 3,713,502 | 1/1973 | Delaney et al. | 280/27 |
| 4,241,857 | 12/1980 | Perethian | 224/32 A |
| 4,372,602 | 2/1983 | Tsuchiya | 296/37.1 X |
| 4,402,439 | 9/1983 | Brown | 224/30 R X |
| 4,469,256 | 9/1984 | McEwen | 280/289 A |

FOREIGN PATENT DOCUMENTS

| 689341 | 3/1940 | Fed. Rep. of Germany | 140/727 |
| PA299852175 | 8/1955 | Fed. Rep. of Germany | 140/727 |
| 2906307 | 8/1980 | Fed. Rep. of Germany | 140/727 |
| 8128047 | 9/1981 | Fed. Rep. of Germany | 140/727 |
| 843034 | 6/1939 | France | 296/37.1 |

Primary Examiner—Randolph Reese
Assistant Examiner—Russell D. Stormer
Attorney, Agent, or Firm—Lyon & Lyon

[57] ABSTRACT

A trunk storage system for use in vehicles having a front leg shield. The trunk storage system has a cavity formed within the front leg shield. A removable trunk is adapted to fit within the cavity and the trunk includes a lid member which forms a continuous surface with the front leg shield. Means are provided for selectively maintaining the trunk in the cavity.

13 Claims, 9 Drawing Figures

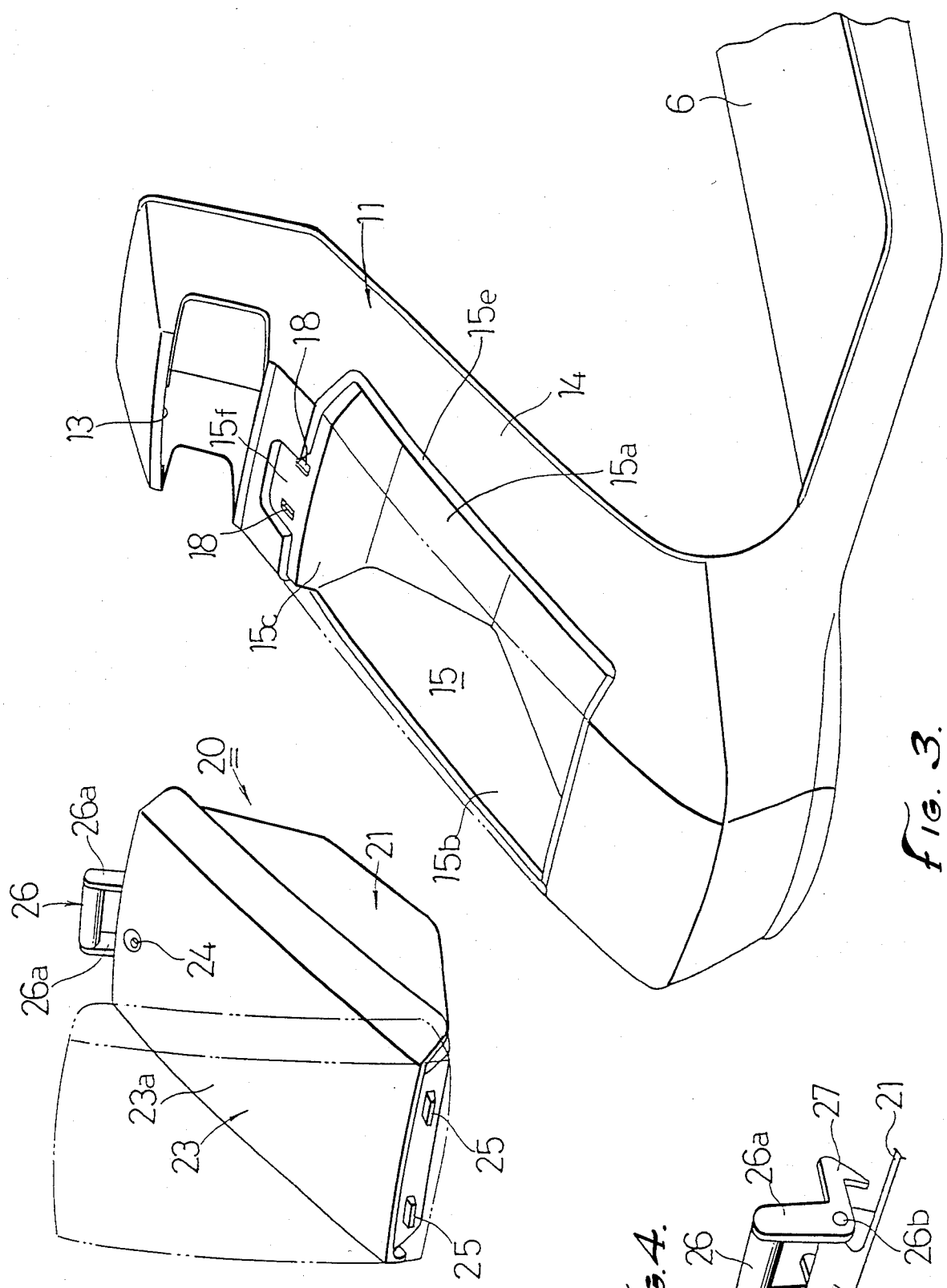
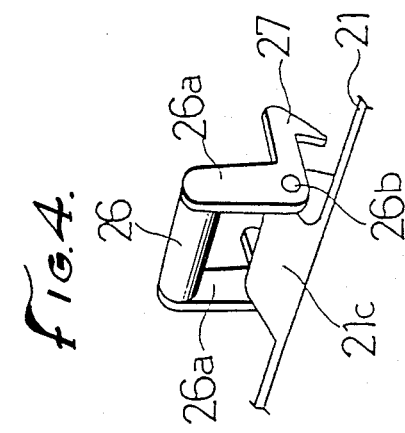

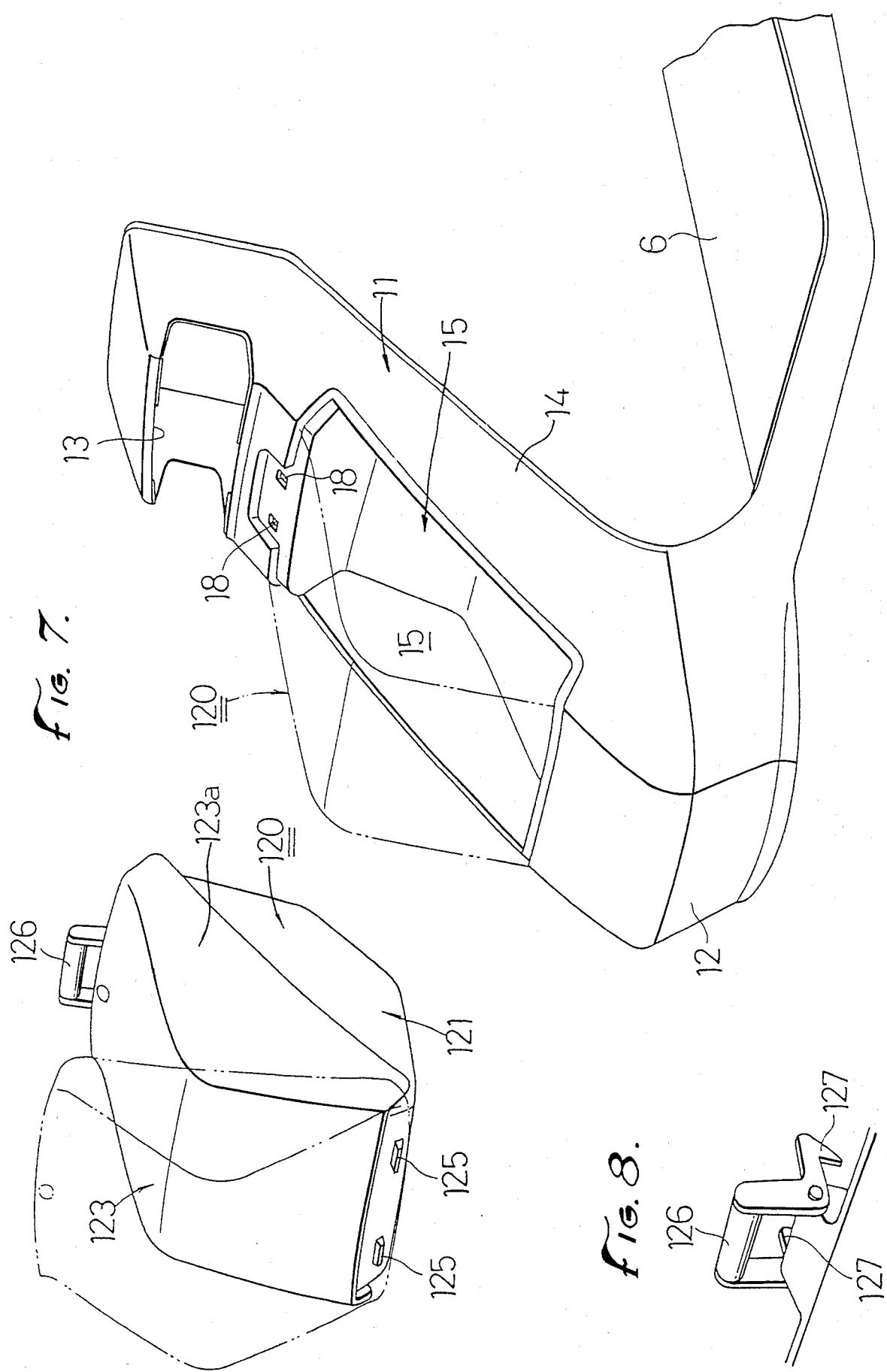

TRUNK STORAGE SYSTEM FOR SMALL VEHICLES

BACKGROUND OF THE INVENTION

This invention relates to trunk storage systems and, in particular, those that are useful with motorcycles, motor tricycles, and other small vehicles.

Heretofore, motorcycles have been provided with a front wheel and a rear wheel, and a motor disposed therebetween. Over the rear wheel, a platform has been arranged which was provided with a trunk or plurality of trunks to store items. These trunks are suspended on the platform with a plurality of rods or other assemblies, thus the trunks are only removable from the platform with a great deal of difficulty.

This applicant has previously provided a motor tricycle having one front wheel and two rear wheels with a motor disposed forward of the rear wheel. In this type of vehicle, it is also desirable that a certain amount of space be provided with the motor tricycle to store things. Because of the size of these vehicles, it is necessary that this storage space be provided in a limited and small space of the vehicle, and it is further desirable that the storage compartment be of a relatively large volume.

SUMMARY OF THE INVENTION

This invention intends to improve previous trunk storage systems used with motorcycles and tricycles and the object of the present invention is to provide a trunk storage system for small vehicles wherein a trunk body for storing articles is removably provided in a cavity which is located within a leg shield provided at the front of the motor tricycle.

A trunk storage system body is removably engaged at both upper and lower ends with the front surface of the leg shield and is disposed within a cavity formed within the leg shield. At one end of the trunk storage system body, there is provided a grip that also acts as a release. At the other end of the trunk storage system body, there are outwardly extending protusions which maintain the trunk storage system body within the cavity, yet provide for its easy removal from the cavity.

The trunk storage system body further is provided with an upper pivotable lid member, thereby enabling the trunk body to provide security when utilized with small vehicles. Furthermore, the lid is useful to permit transportation or carrying of the trunk when removed from the cavity of the leg shield.

In a second embodiment of the present invention, the lid is bulged outwardly to provide greater storage space without having to increase the size of the cavity in the leg shield.

Accordingly, it is an object of the present invention to provide an improved trunk storage system to be used with motorcycles, motor tricycles and other small vehicles. Other and further objects and advantages of the present invention will appear hereinafter.

BRIEF DESCRIPTION OF THE DRAWINGS

The following drawings will illustrate two embodiments of the present invention:

FIG. 3 is an oblique view showing the trunk in a detached condition from the front leg shield of the motor tricycle.

FIG. 4 is an oblique view showing the trunk lock grip.

FIG. 7 is an oblique view showing the trunk of the second embodiment in a detached condition from the front leg shield of the motor tricycle.

FIG. 8 is an oblique view showing the trunk lock grip of the second embodiment.

DETAILED DESCRIPTION OF THE PREFERRED EMBODIMENT

Turning in detail to the drawings, FIGS. 1 through 6 illustrate a first embodiment of the present invention.

Figure 1:
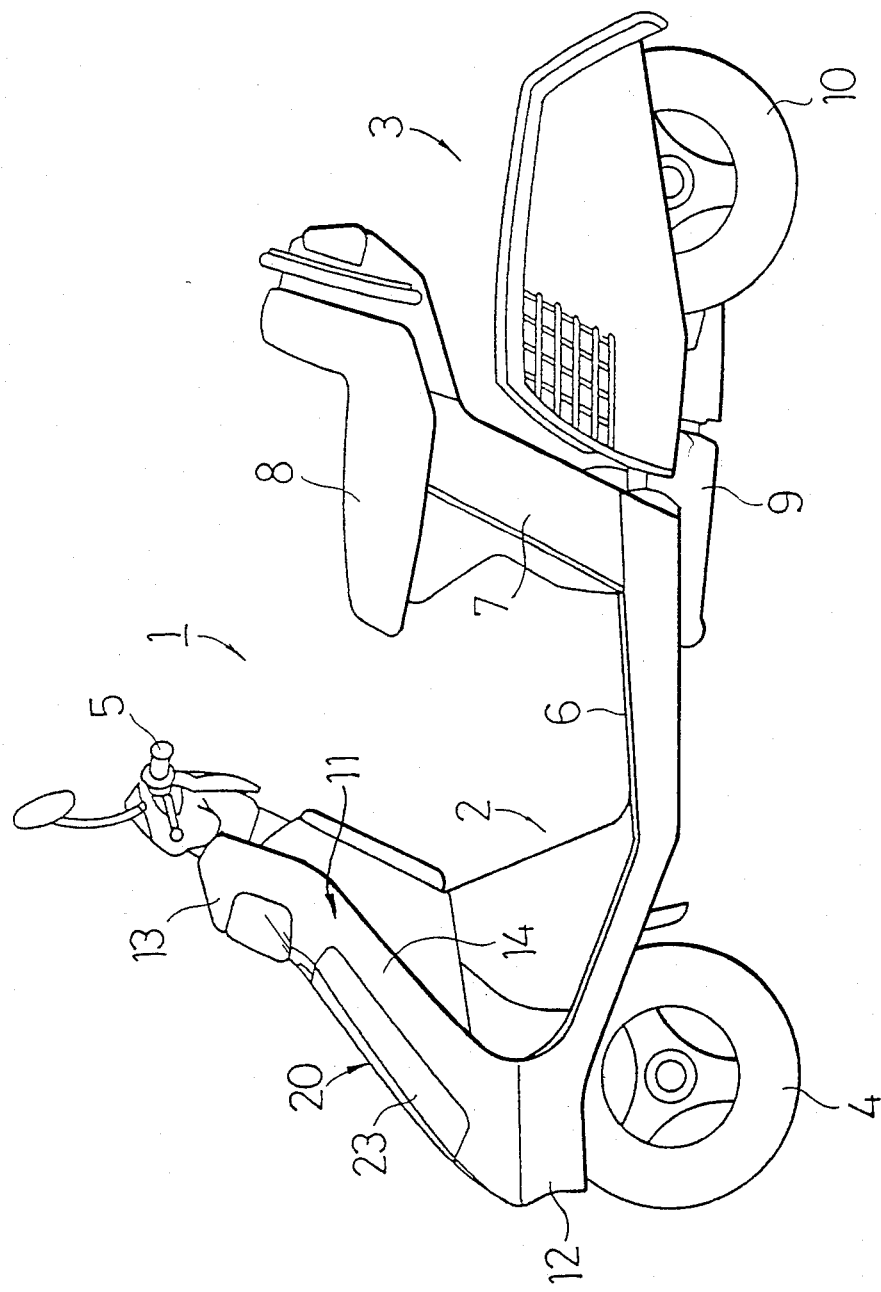
FIG. 1 is a side view showing a motor tricycle.
Figure 2:
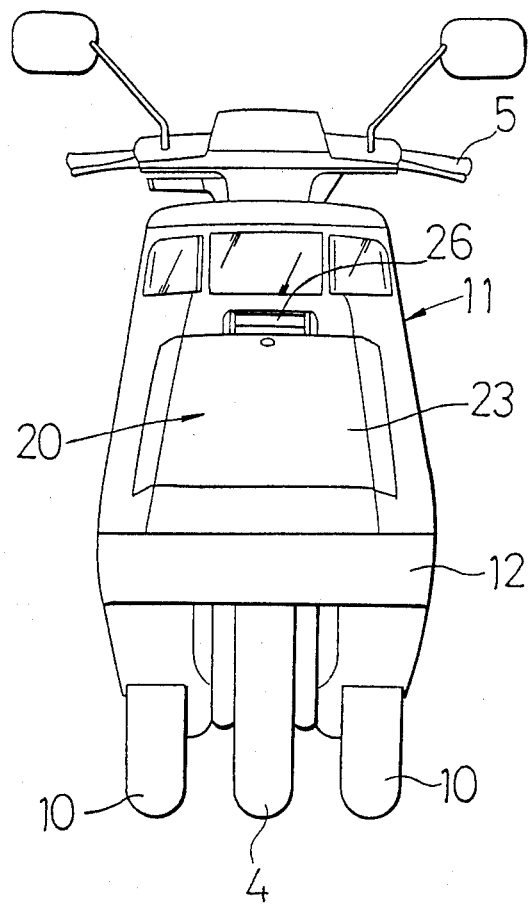
FIG. 2 is a front view showing the same motor tricycle.

FIG. 1 is a side view showing a motor tricycle containing the present invention and FIG. 2 is a front view showing the same motor tricycle. In the first preferred embodiment shown in FIGS. 1 and 2, a tricycle is employed; however, the invention of the present application is also adaptable to motorcycles and motor driven four-wheel vehicles.

In FIG. 1, a tricycle 1 is provided with a front body 2 and a rear body 3. The front body 2 is provided at the forwardmost part of tricycle 1 and has one front wheel 4 constituting a steerable wheel and pivotable about an axis perpendicular to its axis of rotation in response to pivoting of a handle bar assembly 5. At the intermediate portion of the tricycle 1, a floor of the low-floor type profile is provided. A seat post 7 is disposed at an angle with respect to the floor 6 and has a seat 8 affixed to its top. The seat post 7 is provided at the rearmost portion of the floor 6 and is preferably disposed at an obtuse angle with respect thereto.

A joint 9 is vertically swingable and is connected to the lower rear of the front body 2, wherein the joint 9 connects the front body 2 laterally and rotatably to the rear body 3. In the tricycle 1 of this first embodiment, the rear body 3 is provided with two rear wheels 10 constituting the driving wheels. A motor assembly (not shown) is provided forward of the rear driving wheels 10.

At the forwardmost portion of the foregoing front body 2 of the tricycle 1, a leg shield 11 is provided. Leg shields 11 are principally used to provide wind protection for the driver and also to deflect foreign material which would otherwise strike the tricycle 1 or the rider as the tricycle 1 moves.

The leg shield 11 is slightly wider than the body width of a rider and covers a distance from the bottom of the handle bar assembly 5 to the upper part of the front wheel 4. The lower part of the leg shield 11 is intergral with a front fender 12 in the embodiment shown, and the floor 6 is formed from the bottom of the fender 12 and extends rearwardly therefrom.

A storage space 13 for headlight and winkler lamps, opening at the front, is formed in the upper part of the leg shield 11. A left and a right wall 14, 14 of the leg shield 11 are formed vertically and extend from a medial portion of the leg shield 11 to the left and the right of the storage space 13. These walls 14, 14 extend from the storage space 13 to the bottom portion of the leg shield 11 and are designed to abut the front fender 12, as is best shown in FIG. 2.

Figure 5:
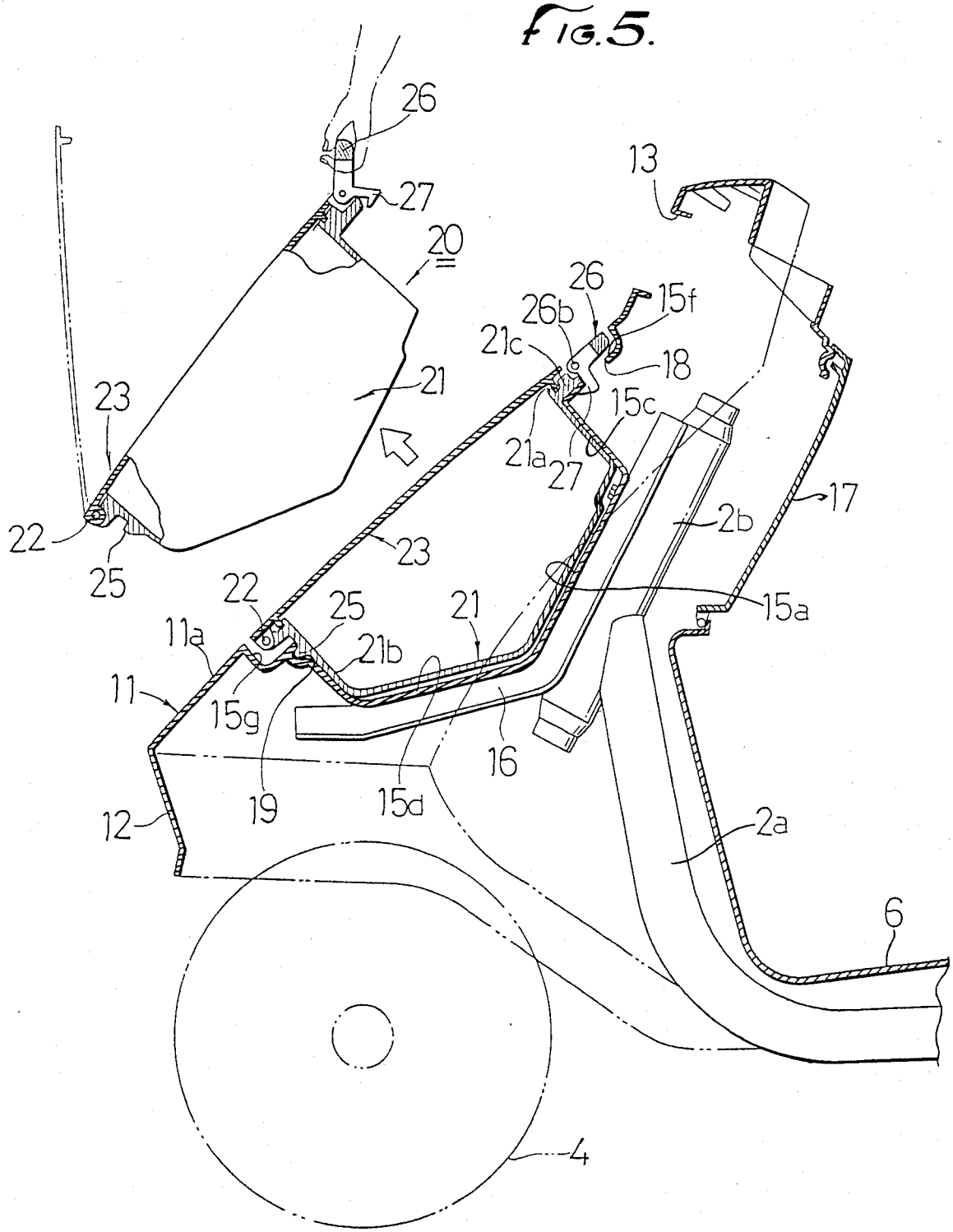
FIG. 5 is a side cut-away view showing the longitudinal section of the trunk and the cavity housing the trunk.
Figure 6:
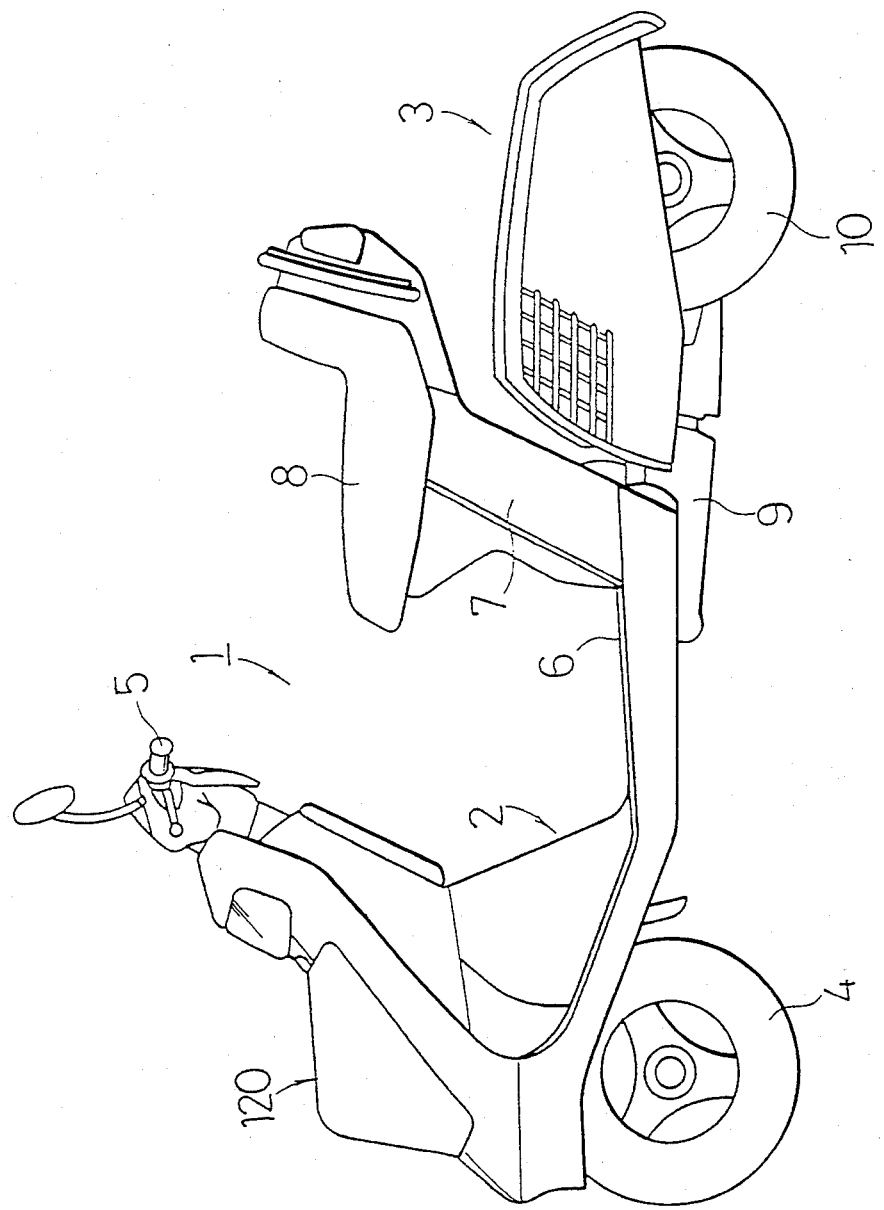
FIG. 6 is a side view showing the motor tricycle in accordance with the second embodiment.
Figure 9:
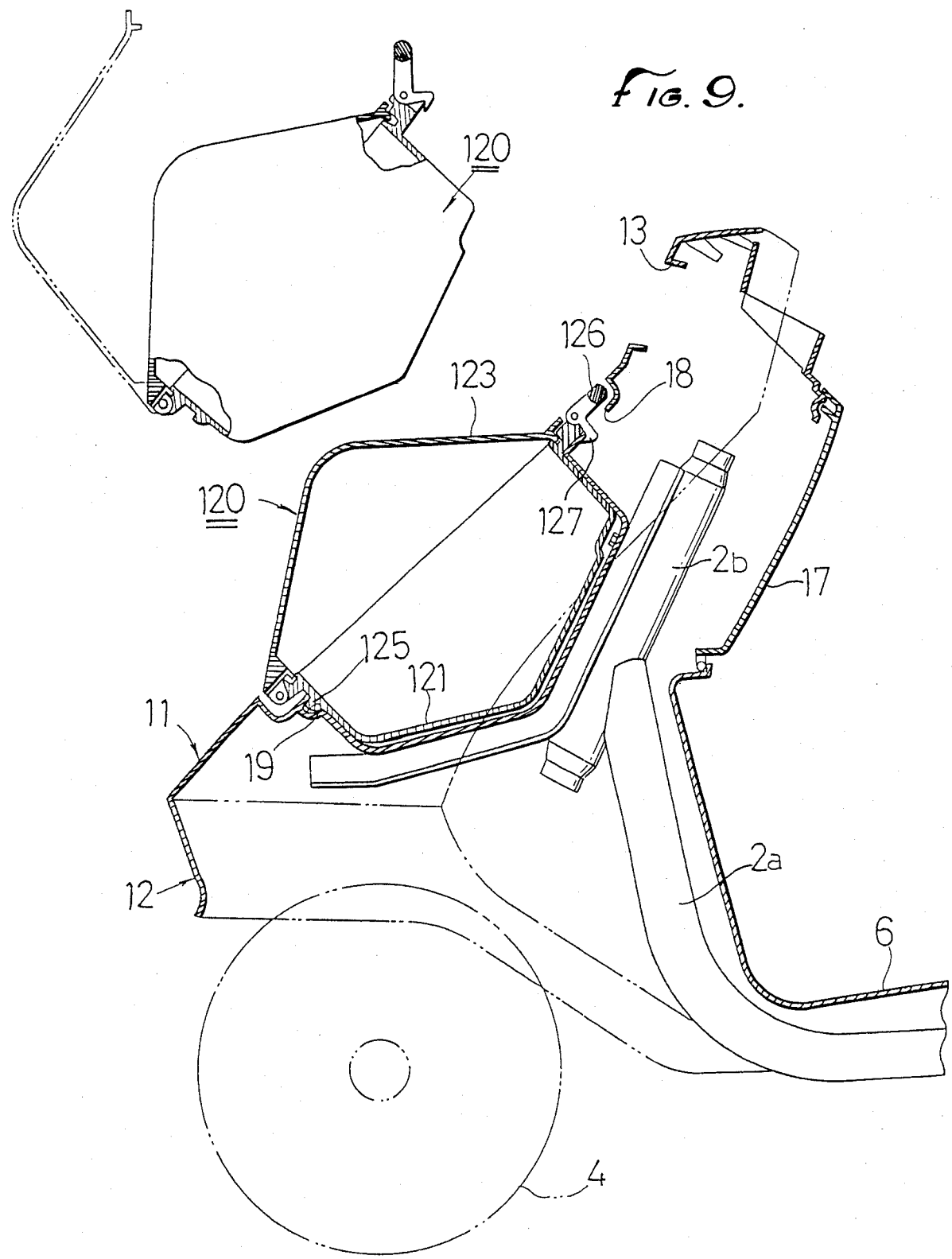
FIG. 9 is a side cut-away view showing the longitudinal section of the trunk of the second embodiment of the present invention.

In accordance with the present invention, an area in the leg shield 11, which is surrounded by the bottom of the storage space 13, and the left and right walls 14, 14 and on its bottom end with the front fender 12 is depressed inwardly to form a compartment cavity 15, as illustrated in FIGS. 3 and 5. A middle portion of the inner base wall 15a of the cavity 15 is located in front of a head tube 2b, as shown in FIG. 5, provided at the front end of the frame 2a which extends below the floor 6.

The base wall 15a is installed upon and supported by the head tube 2b with a bracket 16 placed at a suitable location and rigidly affixed to the head tube 2b. The leg shield 11 is provided to cover the head tube 2b to the rear thereof and is equipped with an openable cover 17 at its back, as illustrated in FIG. 5.

The cavity 15 opens toward the front of the leg shield 11 and is disposed in the intermediate portion of the leg shield 11. The base wall 15a is connected through a left and the right side wall 15b to an upper wall 15c and a bottom wall 15d to form the cavity 15. A cavity step 15f is provided in the upper middle portion of the opening edge 15e which is located within the front exterior surface 11a of the leg shield 11.

At the uppermost portion of the leg shield 11 and within the opening edge 15e, dual engaging slits 18 are provided within the cavity step 15f. As illustrated in FIG. 5, dual engaging dimples 19 are provided on the front end of the bottom wall 15d at the lower part of the opening edge 15e. The engaging dimples 19 are provided on the inner upper part of a step 15g located at the lower end of the opening edge of the front exterior surface 11a of the leg shield 11. These engaging dimples 19 are disposed inwardly from the exterior surface of the wall 15d.

A trunk 20 is removably installed in the foregoing cavity 15. The trunk 20 is shown in FIGS. 3 and 5, and comprises a box shaped body 21 fitted to and stored in the cavity 15 and opened to the front only. A lid 23 is pivotably connected at the lower end of the trunk 20 to the bottom front wall 21b. A hinge 22 is provided to permit pivotal movement of the lid 23 with respect to the body 21. The lid 23 maintains the body 21 in a closed condition with a key-lock device 24 provided in the upper middle portion of the lid 23, as illustrated in FIG. 3.

In the embodiment shown, the lid 23 is formed into a shape such that its exterior surface 23a constitutes part of the front and sides of the leg shield 11 and forms a continuous surface therewith when the body 21 is closed and stored in the cavity 15. Thus, a streamlined and esthetically desirable front surface of the leg shield 11 is provided.

Engaging projections 25 adpated to fit within the dimples 19 are provided on each side of the bottom front wall 21b underside of the body 21. A boss 21c is provided substantially in the center of the opening edge 21a at the upper end of the body 21.

To maintain the body 21 in place and also to carry the body 21 when it has been removed from the leg shield 11, a square shaped operating grip 26 pivots about a pin 26b and is selectively swingably engaged with the boss 21c, whereby the lower ends of its left and right support 26a, 26a are selectively engaged with the underside of the cavity step 15f, as shown in FIG. 5. A hook 27 is integrally provided on each side of the lower ends 26a, 26a and projects rearwardly therefrom to engage the underside of the boss 21c.

In the foregoing, the body 21 of the trunk 20 is stored in the cavity 15, whereby its engaging projections 25, 25 at the bottom front end of the body 21 are fitted within the engaging dimples 19, 19 provided along the bottom wall 15d at the front end of the cavity 15. In this condition, the assembly is tilted rearwardly, whereby the grip 26 is placed against the cavity step 15f and its hooks 27, 27 are disposed through the engaging slits 18, 18. When the grip 26 is in a condition parallel with the cavity step 15f, the hooks 27,27 pass through the slits 18, 18 to lock the body 21 within the leg shield 11. The location of the hooks 27,27 with respect to the slits 18,18 is best shown in FIG. 5.

It is desirable that the grip 26 be biased by a spring or the like to thrust it in the direction of causing engagement between the hooks 27, 27 and the underside of the step 15f below the boss 21c. When the trunk 20 is held in the stored condition, the body 21 is completely immersed in the cavity 15 and the exterior surface of the lid 23 extends about the leg shield 11 and is coplanar with the front exterior surface 11a of the leg shield 11. The hinge 22 at the lid lower end 23 is stored in the step 15g, and the grip 26 is stored in the cavity step 15f. In this condition, the lid 23 many be opened by unlocking the key-lock device 24, while the body 21 is retained in the cavity 15, yet when closed the lid 23 is flush with the leg shield surface 11a and the side walls 14, 14.

Thus, the trunk 20, selectively maintained within the leg shield 11, constitutes a trunk storage system.

To remove the trunk from the leg shield 11, the grip 26 is swung counterclockwise as shown in FIG. 5. The hooks 27, 27 that are integral with the grip 26 thereby swing in the direction of release from the engaging slits 18, 18, and as a result, the upper part of the trunk body 20 is released. In this condition, a person may pull the upper part of the trunk 20 toward him and lift it to take the trunk 20 out of the cavity 15. Thus, the trunk 20 may be removed from the leg shield 11 and become a separate carrying unit as a trunk 20. The separate carrying unit trunk 20 is shown on the left hand side of FIG. 5 and illustrates the use of the grip 26 to carry or transport the trunk 20. The key-lock device 24 is utilizable with the trunk 20 when removed from the leg shield 11 to permit use of the trunk 20 as a separate carrying body.

FIGS. 6 through 9 show a second preferred embodiment of the present invention. The same parts in FIGS. 6 through 9 as those subscribed in the first embodiment, represented by FIGS. 1 through 5, are identified by the same reference numerals, thus a detailed description is omitted herein.

In FIG. 7, a trunk 120 is provided with the same body 121 as described above and engaging projections 125 are provided at the bottom front end of the trunk 120 to fit within engaging dimples 19 at the bottom front end of the cavity 15. Hooks 127 of the grip 126 provided at the upper end of the trunk 120 are disposed through the engaging slits 18 for securing the body 121 within the leg shield 11.

A lid 123 is pivotably connected to the lower end of the body 121 so as to cover the body 121. The opening edge of the body 121 is flush with the leg shield 11, and the intermediate portion in the vertical direction bulges out. The lid 123 is provided on each side with a side plate 123a of approximate triangle shape. The rear end of the lid 123 is located against a respective side of the opening edge of the body 121. The trunk 120 can be removed in the same manner as described with respect to the trunk 20, and in the embodiment shown in FIGS. 6 through 9, the configuration of the lid 123 enables the trunk room to be expanded in volume yet maintain the same cavity size 15 in the leg shield 11.

The foregoing FIGS. 6 through 9 describe one particular embodiment in detail; however, it should be apparent that the lid 123 may be made in other configurations such that even greater volumes may be present, yet maintain the advantages of the present invention.

As it is clear from the foregoing, in accordance with this invention, the leg shield 11 can be used for providing a trunk and space within the steerable section rearwardly of the leg shield 11. The trunk 20, 120 can effectively be utilized for storing things, thereby enhancing the utility of small vehicles, and furthermore, because the trunk 20, 120 is of the removable type, it can be removed from the leg shield 11 to be transported or carried. Thus the trunk 20, 120 is convenient for storing things and may be used as a portable trunk, thus increasing the practical effects of small vehicles.

While embodiments and applications of this invention have been shown and described in great detail, it should be apparent to those skilled in the art that many more modifications are possible without departing from the inventive concepts herein. The invention therefore is not to be restricted except in the spirit of the appended claims.

What is claimed is:

1. A trunk storage system for use in vehicles having a front leg shield, comprising:
   a cavity within the front leg shield;
   a removable trunk adapted to fit within said cavity;
   wherein said trunk includes a lid member which forms a continuous surface with an exterior surface of the front leg shield;
   means for maintaining said trunk in said cavity for selective removal thereof.

2. The trunk storage system of claim 1, wherein lid is buldged outwardly.

3. The trunk storage system of claim 1, wherein said lid includes a locking member to selectively lock said lid to said trunk.

4. The trunk storage system of claim 1, wherein said maintaining means includes means for carrying said trunk when removed from said cavity.

5. The trunk storage system of claim 1, wherein said maintaining means comprises:
   a pivotal handle assembly;
   said handle assembly being selectively engageable with a portion of the front leg shield to maintain a top portion of said trunk in said cavity;
   means for retaining a bottom portion of said trunk in said cavity.

6. The trunk storage system of claim 5, wherein said handle assembly fits within a recess in the front leg shield when said trunk is in said cavity.

7. The trunk storage system of claim 5, wherein said handle assembly comprises:
   a grip;
   a hook attached to said grip, said hook selectively engageable with a portion of said front leg shield;
   means for biasing said hook, said biasing means adapted to bias said hook into engagement with a portion of said front leg shield to maintain said trunk in said cavity.

8. The trunk storage system of claim 1, wherein said lid member is pivotable about an edge of said trunk when said trunk is in said cavity.

9. A trunk storage system for use in vehicles having a front leg shield, comprising:
   a cavity within the front leg shield;
   a removable trunk adapted to fit partially within said cavity;
   a lid pivotably attached to an edge of said trunk, said lid adapted to form a continuous surface with an exterior surface of the front leg shield;
   means for affixing said trunk in said cavity, said affixing means comprising:
   a upper engaging means attached to an upper portion of said trunk and adapted to engage a portion of said cavity;
   a lower engaging means attached to a lower portion of said trunk and adapted to engage a portion of said cavity.

10. A trunk storage system of claim 9, wherein said lid includes a locking member to lock said lid to said trunk.

11. A trunk storage system of claim 9, wherein said lid is flush with an exterior surface of the front leg shield.

12. The trunk storage system of claim 9, wherein said lid is bulged outwardly from an exterior surface of the front leg shield.

13. The trunk storage system of claim 11, wherein said lid is adapted to pivot about an edge of said trunk when said trunk is in said cavity.

* * * * *